United States Patent [19]
Knabe

[11] 3,794,757
[45] Feb. 26, 1974

[54] FM PULSE DISCRIMINATOR FOR DUPLEX FM SYSTEM

[75] Inventor: Frank-Torsten Knabe, Leonberg, Germany

[73] Assignee: International Standard Electric Corporation, New York, N.Y.

[22] Filed: June 7, 1972

[21] Appl. No.: 260,553

[30] Foreign Application Priority Data
July 13, 1971 Germany .................. P 21 34 956.4

[52] U.S. Cl. .................. 178/58, 178/66 R, 325/30, 325/320, 329/126
[51] Int. Cl. .................. H04l 27/14
[58] Field of Search .......... 325/320, 344, 349, 487; 329/107, 110, 112, 126, 137; 178/66 R, 88, 58, 59, 60; 307/233; 328/140

[56] References Cited
UNITED STATES PATENTS

| | | | |
|---|---|---|---|
| 3,627,949 | 12/1971 | Krecic et al. | 325/320 X |
| 3,421,089 | 1/1969 | Lyghounis | 325/320 |
| 3,665,474 | 5/1972 | Thayer | 325/320 X |
| 3,581,220 | 5/1971 | Bell | 329/126 |
| 3,466,550 | 9/1969 | Wolf et al. | 328/140 |

*Primary Examiner*—Benedict V. Safourek
*Attorney, Agent, or Firm*—John T. O'Halloran; Menotti J. Lombardi, Jr.; Alfred C. Hill

[57] ABSTRACT

There is disclosed an FM discriminator for pulse signals transmitted by means of FM in the voice range where the carrier frequency and the modulating frequency are very close in frequency to each other. The discriminator includes a monostable multivibrator triggered by sine waves which are frequency modulated by a pulse signal. The modulating signal is recovered from the output pulses of the multivibrator by integration. The carrier frequency and modulating frequency are separated from each other by frequency doubling. This is accomplished by triggering the multivibrator by control signals derived from both half-cycles of each oscillation of the frequency modulated sine waves.

9 Claims, 4 Drawing Figures

FM PULSE DISCRIMINATOR FOR DUPLEX FM SYSTEM

BACKGROUND OF THE INVENTION

The present invention relates to a discriminator in which a monostable multivibrator is triggered by sinusoidal waves which are frequency modulated by a pulse signal and applied to the input of said discriminator, and from whose output pulses the modulating signal is recovered by integration.

The principle underlying such a discriminator was used for frequency measurement decades ago. From the sinusoidal waves, the frequency of which to be determined, a pulse train of equal repetition frequency was derived. Each pulse of the pulse train had the same energy content, i.e. were equal in height and width, independently of the repetition frequency. By integrating this pulse train, a d.c. value was obtained which was analogous to the frequency being measured. Also known are a number of proposals for such discriminators for the demodulation of frequency modulated signals. In such FM discriminators it is always a prerequisite to flawless operation that the frequency of the frequency modulated carrier wave be very high compared with the highest modulating frequency. Otherwise, the waveform of the modulating signal would be adversely affected by the time constant of the integrator. While the voltage across the integrator is to follow linearly the frequency changes of the carrier, a transition of the output level of the integrator from one value for one frequency to another value for another frequency is to take place so quickly that the waveform of the modulating signal is not unduly affected by the carrier. To this must be added the requirement that in the output signal the carrier components are to be sufficiently suppressed, which, in turn, calls for a sufficient filtering effect of the integrator for the carrier. The integrator should act as a low pass filter, i.e. have a sufficiently high time constant with respect to the carrier.

If data signals or telegraph signals are transmitted in the voice frequency band, the distance between carrier frequency and modulating frequency is relatively small. Particularly at higher signal transmission speeds and if the carrier lies in the lower voice band up to 1,000 Hz (hertz), the above-mentioned requirements can only be achieved with great difficulty, if at all.

SUMMARY OF THE INVENTION

It is the object of the present invention to overcome these difficulties in a discriminator of the kind referred to at the beginning with the lowest possible expenditure.

A feature of the present invention is the provision of an FM pulse discriminator comprising: an input for sine waves frequency modulated by a pulse modulating signal; first means coupled to the input to produce two control signals derived from both half-cycles of each oscillation of the frequency modulated sine waves; a monostable multivibrator coupled to the first means responsive to the control signals to produce output pulses for both half-cycles of each oscillation of the frequency modulated sine waves; and second means coupled to the multivibrator to integrate the output pulse to recover the modulating signal.

Another feature of the present invention is the provision of a bidirectional two-wire data transmission system employing frequency modulation comprising: a first frequency modulation discriminator disposed in one direction of transmission of the transmission system; and a second frequency modulation discriminator disposed in the other direction of transmission of the transmission system; the one direction of transmission having a lower carrier frequency than the carrier frequency of the other direction of transmission; the first discriminator including a first input for first sine wave frequency modulated by a first pulse modulating signal, first means coupled to the first input to produce two control signals derived from both half-cycles of each oscillation of the first frequency modulated sine waves, a first monostable multivibrator coupled to the first means responsive to the two control signals to produce first output pulses for both half-cycles of each oscillation of the first frequency modulated sine waves, and second means coupled to the first multivibrator to integrate the first output pulses to recover the first modulating signal; and the second discriminator including a second input for second sine waves frequency modulated by a second pulse modulating signal, a third means coupled to the second input to produce a third control signal derived fram a selected one of the two half-cycles of each oscillation of the second frequency modulated sine waves, a second monostable multivibrator coupled to the third means responsive to the third control signal to produce second output pulses for the selected one of the two half-cycles of each oscillation of the second frequency modulated sine waves, and fourth means coupled to the second multivibrator to integrate the second output pulses to recover the second modulating signal.

BRIEF DESCRIPTION OF THE DRAWING

Above-mentioned and other features and objects of this invention will become more apparent by reference to the following description taken in conjunction with the accompanying drawing in which:

FIG. 2*b* illustrates a schematic diagram of another embodiment of the monostable multivibrator of FIG. 2*a.

DESCRIPTION OF THE PREFERRED EMBODIMENTS

Figure 1:
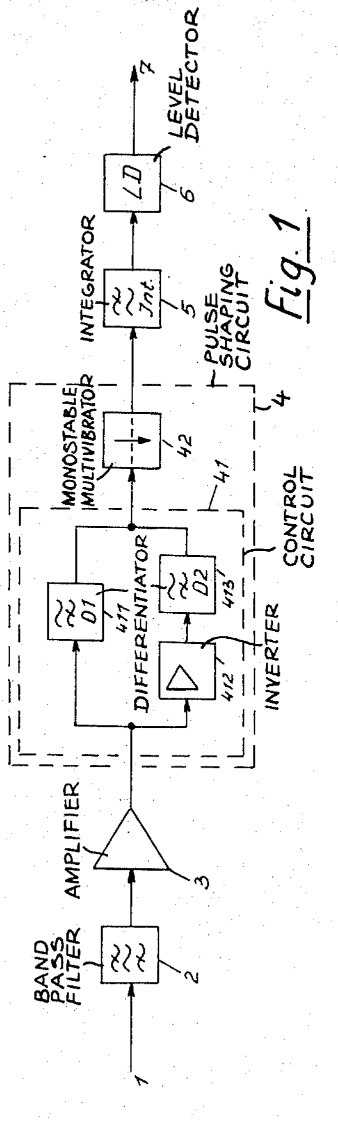
FIG. 1 illustrates a block diagram of the discriminator in accordance with the principles of the present invention.

Referring to FIG. 1, the input to which the incoming transmission path, e.g. a transmission line or a voice channel of a carrier-frequency link, is connected is designated 1. By means of band pass filter 2, the information to be demodulated is filtered out and amplified in an amplifier 3. The output signal of amplifier 3 is applied to a pulse shaping circuit 4, which consists of monostable multivibrator 42 and control circuit 41 for controlling multivibrator 42. The output pulses of monostable multivibrator 42, which have a repetition frequency corresponding to the frequency of the sinusoidal oscillations of the received frequency-modulated pulse signal, but are equal in width and amplitude independently thereof, are then integrated in integrator 5 into a d.c. value proportional to the received frequency, said d.c. value being evaluated in level detector 6, so that the demodulated pulse information appears at the output 7 of said level detector. So far, the arrangement is known in the art.

Integrator 5 must now convert the output pulse signals of monostable multivibrator 42 into a d.c. value which is analogous to the modulating frequency of the frequency-modulated sinusoidal wave. In its output signal, therefore, the individual pulses of the integrated pulse train are to be largely suppressed. On the other hand, however, the information-containing pulse trains of the modulating signal should not be affected by the time constant of the integrator 5 as far as this is possible.

This requirement is very difficult to fulfill if the information content of the modulating signal is relatively high, the frequency of the signal frequency-modulated therewith being relatively low and lying e.g. in the voice band.

The idea underlying the present invention is to increase, for demodulation, the frequency spacing between frequency-modulated signal and modulating signal by frequency doubling, the latter being accomplished according to the invention by monostable multivibrator 42 being triggered once by each half-cycle of the sinusoidal oscillations of the signal to be demodulated rather than by each full sinusoidal oscillation, so that its output supplies a pulse train having a repetition frequency which is twice the frequency of the signal to be demodulated. Using control circuit 41, this is accomplished by the output signal of amplifier 3 being applied directly to a first differentiator 411 and, following inversion in an inverter 412, to a second differentiator 413. The outputs of the two differentiators 411 and 413 now supply a control signal to the input of monostable multivibrator 42 at each half-cycle of the signal to be demodulated, so that a pulse train having the desired double repetition frequency appears at the output of the monostable multivibrator.

Figure 2A:
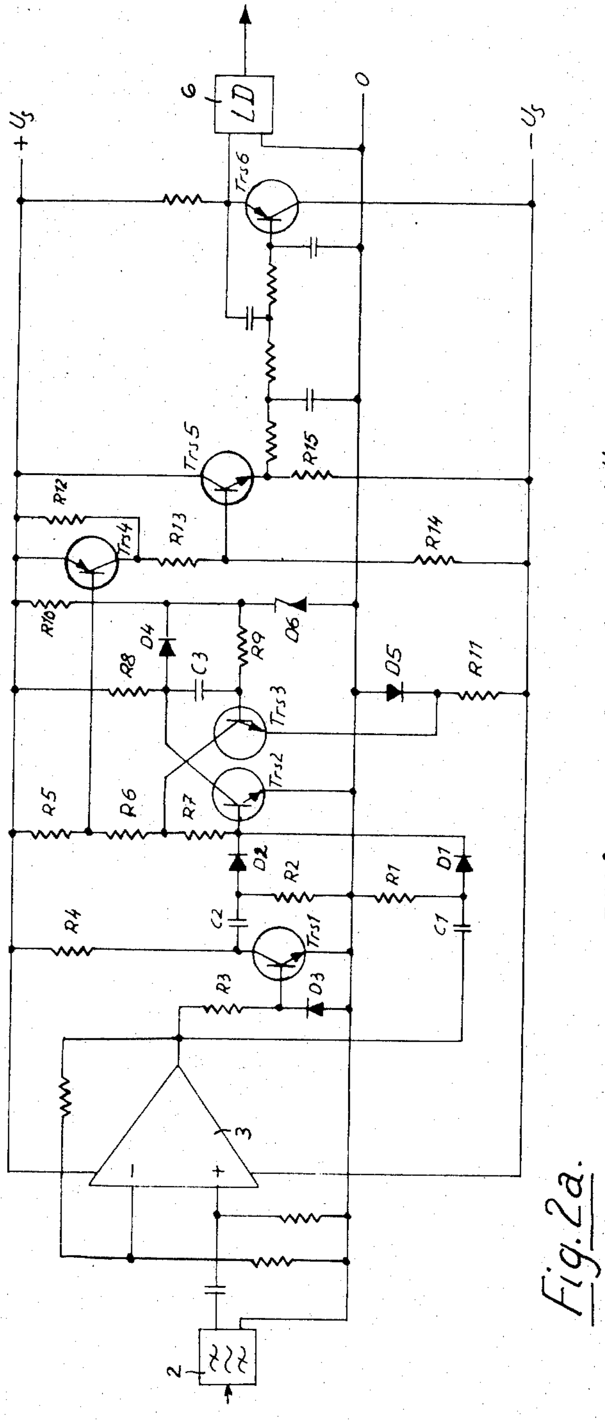
FIG. 2*a* illustrates a schematic diagram of the discriminator of FIG. 1.

The schematic diagram of FIG. 2*a* shows one embodiment of pulse shaping circuit 4, consisting of monostable multivibrator 42 and its control circuit 41. In the schematic diagram, amplifier 3 is an integrated operational amplifier. Its output signal is applied, on the one hand, to the input of a first differentiator, comprising capacitor C1 and resistor R1, and, on the other hand, to an inverter stage, comprising transistor Trs1, resistors R3 and R4, and the diode D3, whose output is connected to the input of a second differentiator, comprising capacitor C2 and resistor R2. The outputs of the two differentiators are connected via decoupling diodes D1 and D2 to the input of the subsequent monostable multivibrator.

A number of requirements must be placed on this monostable multivibrator because its output is to produce square wave pulses whose width and amplitude remain constant at all operating conditions. This means that temperature and supply voltage variations are to have practically no effect on the output signal. This necessitates a number of modifications in the conventional circuit arrangement of a monostable multivibrator. The output signals of the two differentiators are applied, via the diodes D1 and D2, respectively, to the base of transistor T*rs*2. This base is also connected via resistor R7 to the collector of transistor Trs3, which, in turn, is connected via resistors R6 and R5 to the positive pole + $U_s$ of the supply voltage. The emitter of transistor T*rs*2 is connected to the grounded center tap 0 of the supply voltage, while its collector is connected via capacitor C3 to the base of transistor T*rs*3 and via resistor R8 to the positive pole + $U_s$ of the supply voltage and via a diode D4 to the tap of a voltage divider inserted between the positive pole +$U_s$ and the center tap 0 of the supply voltage and consisting of the series connection of resistor R10 and Zener diode D6. Connected via resistor R9 to the same tap of this voltage divider is the base of transistor T*rs*3.

Figure 2B:
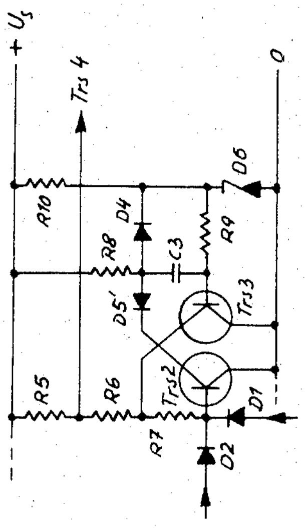

The emitter of transistor T*rs*3 is connected to the tap of a voltage divider inserted between the center tap 0 and the negative pole −$U_s$ of the supply voltage and consisting of diode D5 and resistor R11. The output signal of this monostable multivibrator is taken from the junction point between the two collector resistors R5 and R6 of transistor T*rs*3. A variant of the circuit as shown in FIG. 2*b* consists of the emitter of transistor T*rs*3 also being directly connected to the center tap 0 of the supply voltage, while a further diode D5′ is inserted in the forward direction between the collector of transistor T*rs*2 and the junction point of resistor R8, capacitor C3, and diode D4.

By means of Zener diode D6, there is achieved in connection with diode D4 that the collector potential of transistor T*rs*2 is limited to the value $U_{D6} + U_{D5}$ (cut-off transistor T*rs*2), the charging voltage of capacitor C2 thereby having been fixed, too. By the two other alternative measures — biasing the emitter of transistor Trs3 to the potential $-U_{D5}$ or connecting the diode D5′ in the forward direction to the collector of transistor T*rs*2 — the effect of temperature variations on the base/emitter saturation voltage of transistor T*rs*3 is compensated for.

If capacitor C3 and resistor R9, i.e. the elements determining the time constant of the monostable multivibrator, are chosen so that this timing circuit exhibits no, or a completely negligible, temperature variation, this circuit arrangement meets all requirements placed on the temperature stability and independence of supply-voltage variations. To this end, capacitor C3 is advantageously a mica capacitor, and resistor R9 is a metal film resistor.

Following amplification and impedance matching in an amplifier consisting of transistors T*rs*4 and T*rs*6, the output signal of the monostable multivibrator is applied to integrator 5. In the example of FIG. 2, this integrator is an RC low-pass filter, the frequency-dependent feedback from the emitter of the following transistor T*rs*6 causing a steepening of the filter characteristics. This integrator is followed by level detector 6, for which known threshold circuits, such as Schmitt Triggers may be used.

Figure 3:
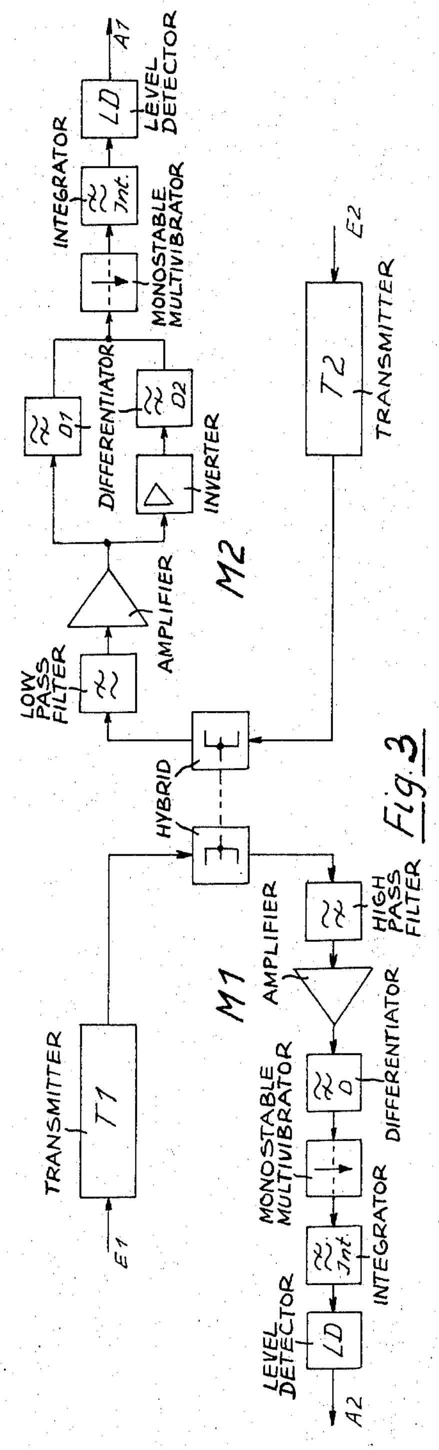
* and FIG. 3 illustrates a block diagram of a bidirectional two-wire data transmission system employing the discriminator in accordance with the principles of the present invention.

Referring to FIG. 3, the arrangement of a data transmission system for bidirectional traffic and comprising the modems M1 and M2 will now be described. This data transmission system may be used for the transmission of any data in binary form, e.g. also telegraph characters, and, in addition thereto, for the connection of teleprint subscribers to a teleprint exchange. If one direction of transmission operates, for example, with the frequencies 500 and 700 Hz for the 0 and 1, respectively, and the other direction operates with the frequencies 2,250 and 3,150 Hz, frequency doubling may be dispensed with for the direction of transmission with the high frequencies because in this case the spacing between the carrier frequency and the modulating frequency is sufficiently great to insure sufficient carrier suppression and sufficiently small distortions by integrator 5.

The modem M1 comprises a transmitter T1 for the transmitting frequencies 500 and 700 Hz and a receiver for the frequencies 2,250 and 3,150 Hz. Transmitter and receiver are connected to the line via a first hybrid set. Instead of band-pass filter 2 of FIG. 1, use is made of a high-pass filter in the receiver, and the inverter stage 412 and the differentiator 413 have been omitted because frequency doubling is not necessary as a result of the high transmitting frequencies. The other modem comprises transmitter T2 for the frequencies 2,250 and 3,150 Hz and a receiver for the frequencies 500 and 700 Hz, which are connected via a further hybrid set to the direction of transmission. The receiver corresponds to that of FIG. 1, except that a low-pass filter is used instead of the band-pass filter 2.

The replacement of the band-pass filter by a low - or high-pass filter is possible here because the whole voice band is used for the bidirectional transmission. The details of the circuit, as far as they form part of the present invention, are shown in FIG. 2. Since the ratio of the frequencies of the lower frequency direction of transmission to those of the higher frequency direction of transmission is about 1:4, while the relative frequency deviations of both directions are equal to one another, approximately equal level deviations of the d.c. signals are obtained at the discriminator output if the pulse duration at the output of the monostable multivibrator for the lower frequency direction of transmission is chosen twice as long as that at the output of the monostable multivibrator for the higher frequency direction of transmission, which can be easily made possible by duplicating the timing circuit consisting of capacitor C2 and resistor R9.

While I have described above the principles of my invention in connection with specific apparatus it is to be clearly understood that this description is made only by way of example and not as a limitation to the scope of my invention as set forth in the objects thereof and in the accompanying claims. I claim:

1. A bidirectional two-wire data transmission system employing frequency modulation comprising:
- a first frequency modulation discriminator disposed in one direction of transmission of said transmission system; and
- a second frequency modulation discriminator disposed in the other direction of transmission of said transmission system;
- said one direction of transmission having a lower carrier frequency than said carrier frequency of said other direction of transmission;
- said first discriminator including
  - a first input for first sine wave frequency modulated by a first pulse modulating signal,
  - first means coupled to said first input to produce two control signals derived from both half-cycles of each oscillation of said first frequency modulated sine waves,
  - a first monostable multivibrator coupled to said first means responsive to said two control signals to produce first output pulses for both half-cycles of each oscillation of said first frequency modulated sine waves, and
  - second means coupled to said first multivibrator to integrate said first output pulses to recover said first modulating signal; and
- said second discriminator including
  - a second input for second sine waves frequency modulated by a second pulse modulating signal,
  - a third means coupled to said second input to produce a third control signal derived from a selected one of the two half-cycles of each oscillation of said second frequency modulated sine waves,
  - a second monostable multivibrator coupled to said third means responsive to said third control signal to produce second output pulses for said selected one of the two half-cycles of each oscillation of said second frequency modulated sine waves, and
  - fourth means coupled to said second multivibrator to integrate said second output pulses to recover said second modulating signal.

2. A system according to claim 1, wherein
- said first multivibrator produces said first output pulses in response to said two control signals at both the positively and negatively directed zero crossings of each oscillation of said first frequency modulated sine waves; and
- said second multivibrator produces said second output pulses in response to said third control signal only at a selected one of either the positively and negatively directed zero crossings of each oscillation of said second frequency modulated sine waves.

3. A system according to claim 2, wherein
- said first means includes
  - a first differentiator coupled to said first input to produce one of said two control signals,
  - an inverter coupled to said first input; and
  - a second differentiator coupled to said inverter to produce the other of said two control signals; and
- said third means includes
  - a third differentiator coupled to said second input to produce said third control signal.

4. A system according to claim 3, wherein
- said first means further includes
  - a low pass filter coupled to said first input, and
  - a first preamplifier coupled between said low pass filter and said first differentiator and said inverter; and
- said third means further includes
  - a high pass filter coupled to said second input, and
  - a second preamplifier coupled between said high pass filter and said third differentiator.

5. A system according to claim 4, wherein
- said first multivibrator produces said first output pulses having a constant pulse length and height; and
- said second multivibrator produces said second output pulses having a constant pulse length and height.

6. A system according to claim 5, wherein each of said first and second multivibrators includes
- a supply voltage, and
- a voltage divider coupled to said supply voltages to provide a reference voltage to compensate for supply voltage variations
- said voltage divider having
  - a zener diode, and a clamping diode coupled in series to said zener diode.

7. A system according to claim 6, wherein each of said first and second multivibrators includes a pair of interconnected transistors, a timing circuit incorporating one of said pair of transistors, and a diode coupled to base-emitter circuit of said one of said pair of transistors to compensate for temperature variations of the saturation voltage of said base-emitter circuit.

8. A system according to claim 7, wherein each of said first and second multivibrators includes said timing circuit further having a capacitor connected to the base of said one of said pair of transistors, and a resistor connected to the base of said one of said pair of transistor, said capacitor being a mica capacitor and said resistor being a metal film resistor to compensate for temperature variations in said timing circuit.

9. A system according to claim 1, wherein a ratio of 1:*n* exists between said carrier frequency of said one direction of transmission and said carrier frequency of said other direction of transmission, and the widths of said first and second output pulses have a ratio of *n*:2, where *n* is an integer greater than one.

* * * * *